Figure 1:
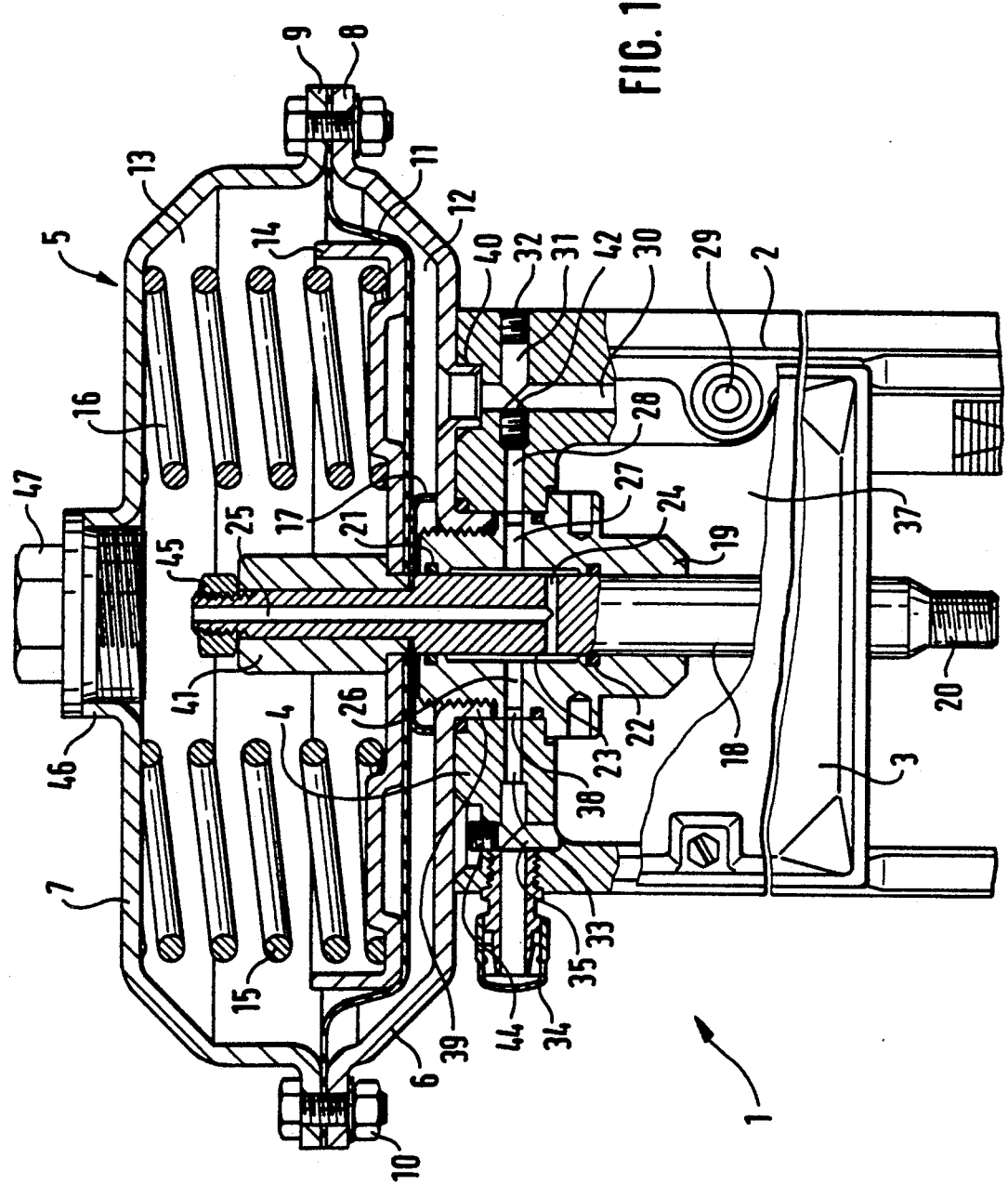

United States Patent [19]

Kaspers

[11] Patent Number: 5,279,325
[45] Date of Patent: Jan. 18, 1994

[54] PNEUMATIC CONTROL DRIVE

[75] Inventor: Rudiger Kaspers, Tonisvorst, Fed. Rep. of Germany

[73] Assignee: Arca Regler GmbH, Tönisvorst, Fed. Rep. of Germany

[21] Appl. No.: 892,828

[22] Filed: Jun. 5, 1992

[30] Foreign Application Priority Data

Jun. 6, 1991 [DE] Fed. Rep. of Germany ... 9106924[U]
Sep. 4, 1991 [DE] Fed. Rep. of Germany ... 9110959[U]

[51] Int. Cl.$^5$ .............................................. F15B 15/10
[52] U.S. Cl. ......................................... 137/270; 91/54;
92/59; 92/94; 92/99; 92/110; 251/61.4; 251/61.5
[58] Field of Search .................. 91/54; 92/59, 94, 99, 92/100, 110; 137/270; 251/61.4, 61.5

[56] References Cited

U.S. PATENT DOCUMENTS

| 3,426,788 | 2/1969 | Bassett | 137/270 |
| 3,799,008 | 3/1974 | Danek | 92/99 X |
| 4,244,392 | 1/1981 | Griswold | 137/107 X |
| 4,343,224 | 8/1982 | Kemmler | 91/47 |
| 4,505,188 | 3/1985 | Weydt et al. | 92/59 X |
| 4,509,403 | 4/1985 | Gassman et al. | 91/365 |
| 4,922,952 | 5/1990 | Kemmler | 137/382 |

FOREIGN PATENT DOCUMENTS

3637068 12/1987 Fed. Rep. of Germany.

Primary Examiner—Gerald A. Michalsky
Attorney, Agent, or Firm—Joseph W. Berenato, III

[57] ABSTRACT

A pneumatic control drive 1, 51, 71 for control devices, in particular control valves, comprises a drive housing 5 and a drive member 11 displaceable therein and to which is affixed a drive element 18 displaceable together with said drive member 11 to actuate the control device and exiting the drive housing 5, said drive member dividing the drive housing 5 into a pressure chamber 12 and a reset chamber 13 with a reset member 15, 16 loading the drive member 11. A position controller 3 is adjacent to one of the chambers (13) and communicates through an inner air-supply duct 30, 28, 55, 74 with the pressure chamber 12, a vent duct 35, 58, 76 issuing from the reset chamber 13 toward a vent aperture. In the invention, the drive element 18 comprises an air-supply duct 24, 25 issuing at the side of the drive member 11 away from the position controller 3 into the pressure chamber 12 there. The air-supply duct 20, 25 extends to a hookup 23 adjacent to the position controller 3, the hookup 23 communicating with the air-supply duct 23, 28, 55.

36 Claims, 6 Drawing Sheets

PNEUMATIC CONTROL DRIVE

DESCRIPTION

The invention concerns a pneumatic control drive for control devices, in particular for control valves, comprising a drive housing with a displaceable drive member to which is affixed a drive element displaceable by the drive member and projecting from the drive housing, said element serving to actuate the control device and said drive member dividing the drive housing into a pressure chamber and into a reset-position chamber with a reset-position member loading the drive member, one position controller being mounted near one of the chambers and communicating through an inner air-supply duct with the pressure chamber, and a vent duct extending from the reset-position chamber to a vent aperture.

Such control drives are known in many designs (for instance U.S. Pat. Nos. 4,922, 952; 4,509,403 and 4,343,224 and German patent 36 37 068) and serve to drive control devices, in particular control valves such as are prevailingly employed in the control circuit of process-technology plants. Most of them are in the form of membrane control-drives. Such membrane control-drives comprise as a rule a circular membrane housing which is the drive housing and consists of two screwed-together pot-shaped housing shells between the abutting flanges of which is clamped a flexible membrane acting as the drive member. A drive rod serving as the drive element is affixed to the center of the membrane and is displaceably supported together with the membrane, exiting the membrane housing at its lower end. The free end of the drive rod is linked for instance to the valve rod of the control valve.

To improve the control accuracy of the particular control device, a position controller is mounted on the membrane control drive. It compensates errors from the particular position of the control device, for instance errors due to friction in fabric liners or due to medium reaction. The position controller is supplied with compressed air and a compressed-air line passes from it to one of the two chambers of the membrane housing, ie the pressure housing, separated by the membrane. By controlling the air supply, the membrane position and hence that of the drive elements will be affected. As a result the membrane is loaded on the side away from the pressure chamber by a reset member which as a rule is one or more springs, so that the membrane will be reset in the presence of controlled pressure relief. The rest member is mounted inside the reset chamber separated by the membrane from the pressure chamber. A vent duct issues from the reset chamber and thereby the reset chamber communicates with the atmosphere.

As regards the design of the same species (U.S. Pat. No. 4,922,952), the position controller is affixed immediately below the membrane housing in a yoke present there, which is also called "cage". The air supply to the pressure chamber adjacent to the position controller takes place through a minimum internal path, that is, not through an externally projecting air supply duct. As a result complex piping susceptible to damage could be avoided. Additionally, the arrangement offers the advantage that misalignments are precluded during shipping and the displacement tap for position control is protected against contact and environmental factors.

A fully encapsulated guide means for the air-supply duct presumes that the pressure chamber shall be underneath and thereby adjacent to the position controller. However in nearly half the applications, the membrane must be pressurized from above. In conventional membrane position controls, this requirement is met in that the membrane housing or at least the membrane together with the reset member can be easily mounted in the reverse position so that the pressure chamber and the reset chamber exchange positions. In order to avert a complex and susceptible pipe-system in these cases, it has been suggested that the position controllers be mounted inside the membrane housing (German patent 36 37 068). This solution however is cumbersome and entails substantial equipment height.

Accordingly it is the object of the invention to so design a control drive of the initially cited kind that even for a pressure chamber present on the side away from the position controller, external pipes, especially for the air-supply duct, can be averted while compactness is retained.

This problem is solved by the invention in that the drive element comprises an air-supply duct issuing on the side of the drive member away from the position controller into the pressure chamber there, and in that the air-supply duct leads to a hookup near the position controller and communicating with the air-supply duct.

Accordingly, in the invention, the air-supply duct from the position controller is continued by a air-supply duct passing through the drive element and thereby also passing through the drive member and issuing only on the side away from the position controller into the pressure chamber there. Therefore the drive element serves to supply air to the pressure chamber. As a result and for the first time, an inner pipe system is also offered for the case of the pressure chamber and the position controller not being near each other, no increase in height being necessary thereby.

However this discovered solution is not restricted to the present application. The air-supply duct can also be fruitfully mounted in the drive element in those cases when the pressure chamber is near the position controller. In this instance the venting of the reset chamber can take place through this air-supply duct provided its hookup near the position controller then shall communicate with the vent duct present there. In this case venting also may take place in the so-called ventilation chamber of the position controller, as a result of which, aside the ventilation chamber, the reset chamber too is protected against a corrosive atmosphere, such as may be present in the chemical industry, by the exhaust air from the position controller.

In particular the basic concept of the present invention is suitable for control drives in which the pressure chamber and the reset chamber can be mutually exchanged for instance by reversing the membrane-housing assembly. In that case the invention provides that the drive element comprises an air-supply duct, just as in the above described cases, which issues at the side of the drive member away from the position controller into the chamber there, and in that the air-supply duct leads to a hookup near the position controller, said hookup communicating, or being able to, in a second assembly mode, between the drive member and the reset member, on one hand, and on the other with the position controller and the communication between the position controller and the chamber near it being blocked, or allowing blocking, and this chamber being open, or able to open, toward the, or a further, vent duct, the hookup communicating or being able to communicate in a first assembly mode of the drive member and the reset member with the vent duct while the hookup to the chamber near the position controller is blocked, and the air-supply duct being open or able to open to the chamber near the position controller.

In the invention, therefore, the particular chamber near the position controller of such a membrane control drive can communicate directly, depending on the assembly mode, in one case with the vent duct and in the other case with the air-supply duct, and in each instance vice-versa the air-supply duct inside the drive element can communicate with the air-supply duct or the vent duct.

In both cases the air is moved through the air-supply duct inside the drive element to the particular chamber which is far from the position controller, be it for the purpose of venting when this chamber is the reset chamber, or for the purpose of air supply when this chamber is the pressure chamber. Thereby a completely internal pipe system has been achieved also for those control drives in which the control system can be reversed in easy mechanical manner. The ensuing advantages therefore are also made effective with this quite universal type of control drive.

It is quite feasible as regards the hookup to the air-supply duct that it moves together with the drive element provided that flexible hookups be provided to the air-supply duct or the vent duct. Alternatively it is possible to design the hookup as a transfer space into which issues the air-supply duct and which is enclosed by a stationary hookup muff inside which the drive element is guided in sliding manner and is sealed relative to two sides. Use is made of the eventuality of the pressure chamber being near the position controller calling anyway for sealing the exit of the drive element. The transfer space can be annular but also it may be in the form of a helical transfer groove of which the groove shoulder rests in guiding manner against the drive element. The latter design offers the advantage of improved drive-element guidance.

In an especially simple embodiment mode, the hookup muff enters the drive housing and the air-supply duct and/or the vent duct passes through the hookup muff and issues from it into the chamber near it. The aperture provided anyway in the drive housing to pass the drive element may be used for that purpose, additional apertures for the air-supply duct and/or the vent duct then being eliminated if so desired. An embodiment mode that was found especially appropriate provides a tap from the air-supply duct in the hookup muff and a supply-duct segment issuing into the adjacent chamber, the supply-duct segments being alternatingly sealable to make possible the supply of compressed air in one case into one of the chambers and in the other case into the other. The supply-duct segment leading into the adjacent chamber may be fitted with a vent-duct segment and this vent-duct segment and this supply-duct segment being alternatingly sealable in such manner that the adjacent chamber in one case communicates with the vent-duct segment and in the other with the position controller. In that case a further vent-duct segment is appropriately provided which communicates with the transfer space, said vent-duct segment being alternatingly closed or open, or able to close or open, when the vent-duct segment communicating with the supply-duct segment is open or closed resp.

Screw-in stoppers are suitable to close the air-supply and vent ducts and to tap them, and they may be inserted in sealing manner at the appropriate sites. However valves, in particular magnetic valves, might also be used, as a result of which assembly work when reversing the drive would be further decreased.

In a further embodiment mode of the invention, the drive member and the reset member together with the drive housing and following removal of the drive member from the drive element can be set up from the first into the second assembly mode and vice-versa. A particularly advantageous design for this embodiment consists in providing a first air-supply duct for the drive housing on the side of the pressure chamber, said first air-supply duct being mounted in such a way that in the first assembly mode of the drive housing it is linked to the position controller and directly issues into the pressure chamber, whereas, in the second assembly mode, it can be sealed, and further said design consists in the drive housing comprising a second air-supply duct at the side or the reset chamber which is mounted in such a way that for the second assembly mode of the drive housing it is linked to the position controller and the hookup, being sealable in the first assembly mode. In this design therefore the air-supply ducts are parts of the drive housing, and are installed in such a way that the required connections to the position controller are set up solely by the drive housing being in the first or in the second assembly mode, in such a way that this position controller communicates with the pressure chamber. As a result assembly is extraordinarily simplified.

Moreover, on the side of the pressure chamber, the drive housing shall comprise a first air-supply duct which can be sealed in the second assembly mode and which is installed in such a way that in a first assembly mode it communicates on one hand with the vent aperture and on the other hand with the hookup. Consequently the drive housing shall be provided at the side of the reset chamber with a second vent-duct segment which can be sealed in the first assembly mode and which is installed in such manner that for the second assembly mode it communicates with the vent aperture.

In a further embodiment of the invention, the drive member is affixed as desired at different heights to the drive element in order to provide space in each case for the reset member while minimizing the bulk of the drive housing.

In known manner, the drive housing is appropriately mounted on a base comprising in it the air-supply and the vent ducts for instance in the form of suitable boreholes. In particular the base can assume the form of a so-called "cage" implementing the fastening of the control drive to the actual control device, for instance a valve. Advantageously the hookup to the air-supply duct in the drive element shall be present in a base aperture.

In principle the position controller also can be mounted on the top side of the drive housing. However it has been found that the mounting known per se on the side of the drive-element exit, namely underneath the drive housing and between same and the control device is practical.

In a further feature of the invention, the air-supply duct is fitted with an externally sealable hookup. The position controller can be circumvented by this hookup to the outside, for instance by means of a magnetic valve.

Lastly the invention provides that the, or one of the, vent duct(s) issue(s) into a ventilation space of the position controller so that the reset chamber be protected against any corrosive atmosphere.

The invention is shown in further detail in the drawing of an illustrative embodiment.

Figure 2:
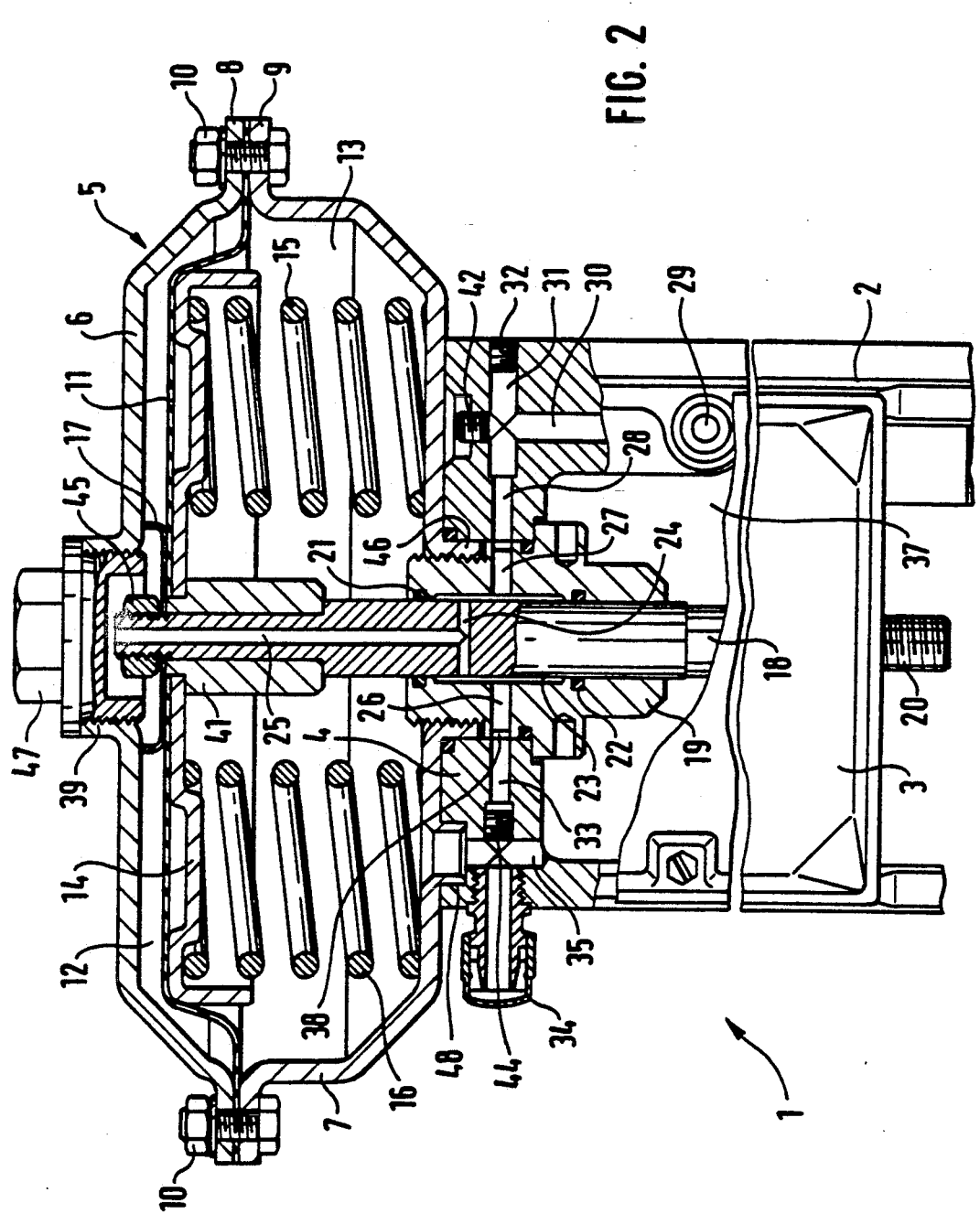
Figure 3:
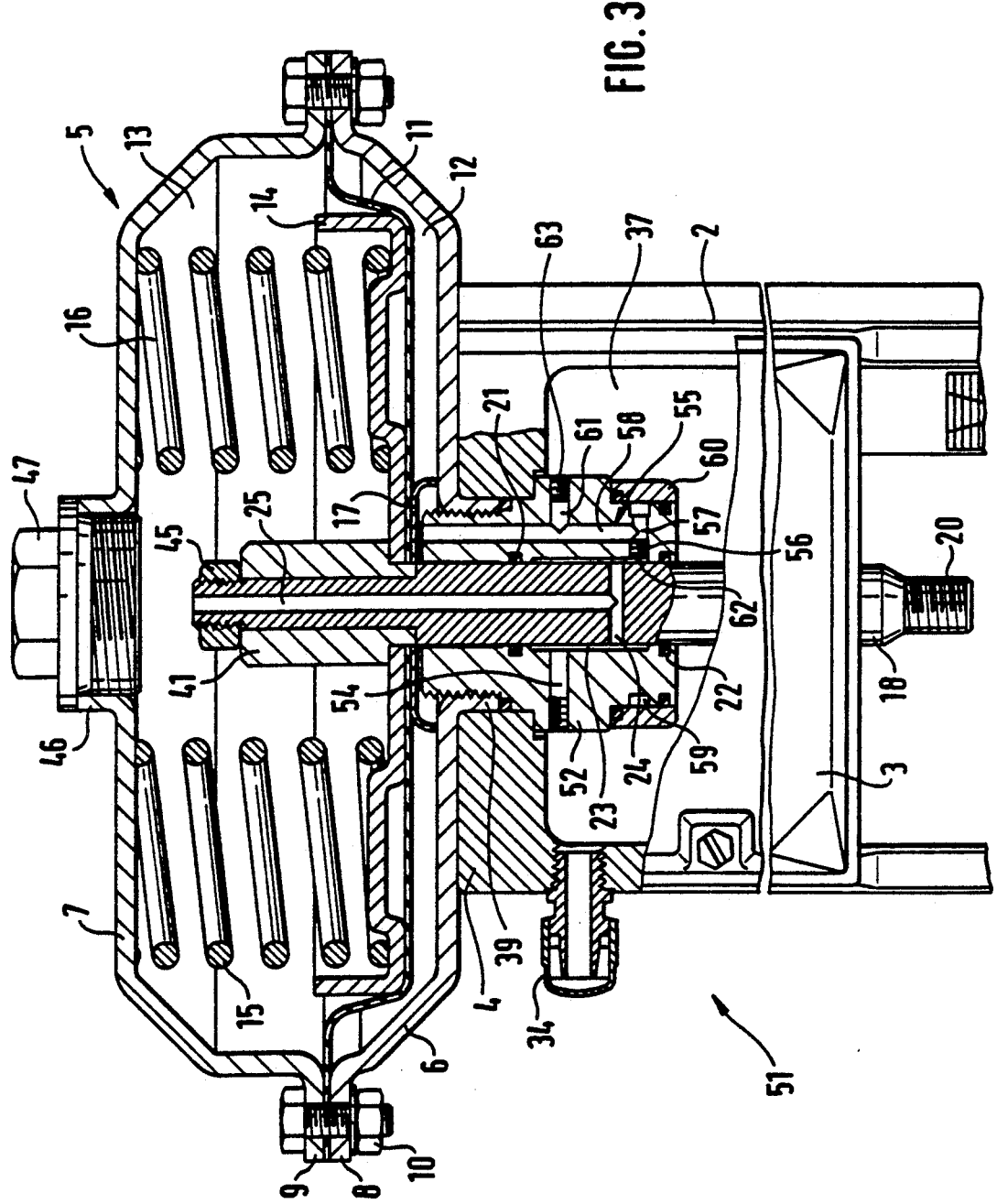
Figure 4:
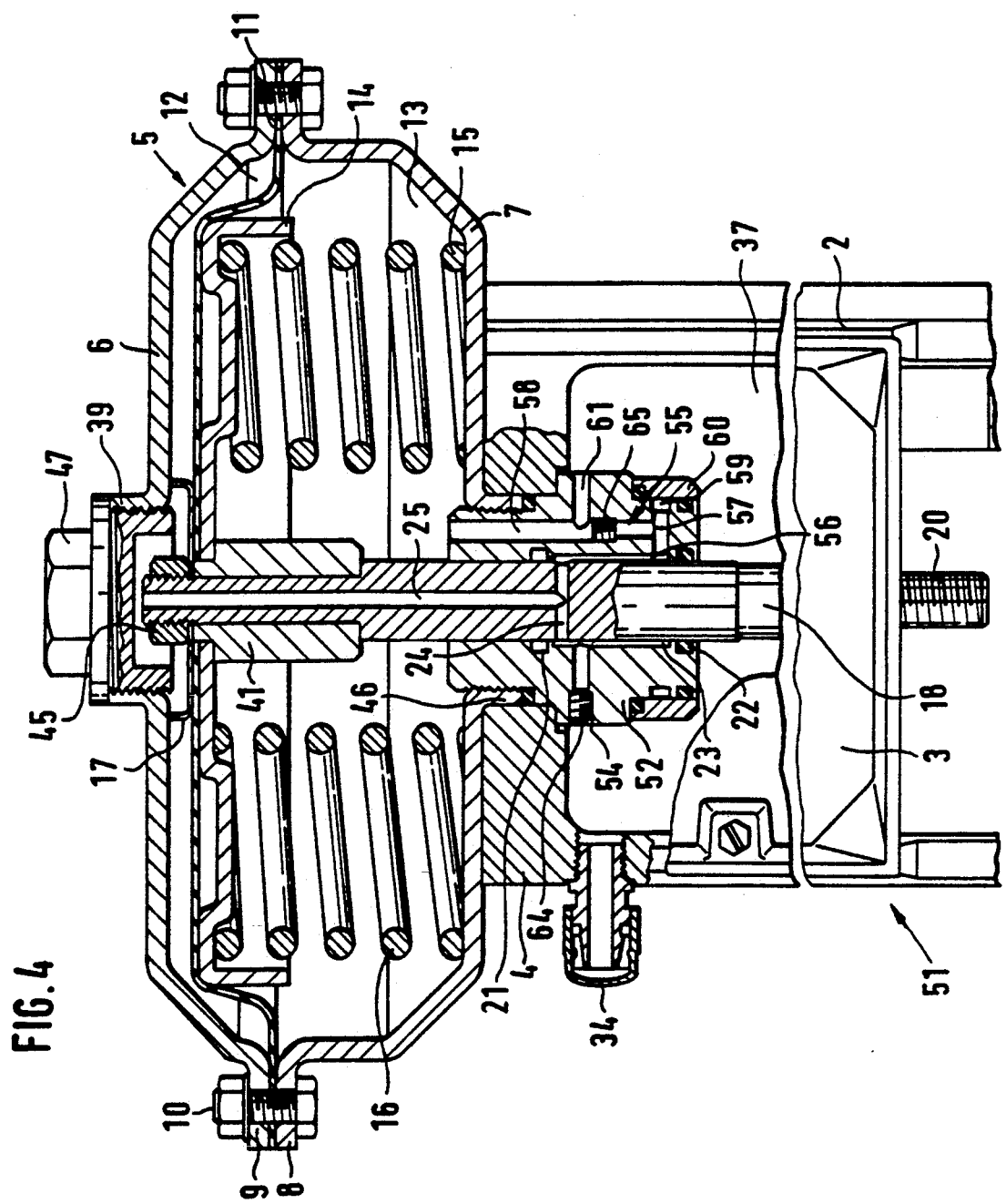
Figure 5:
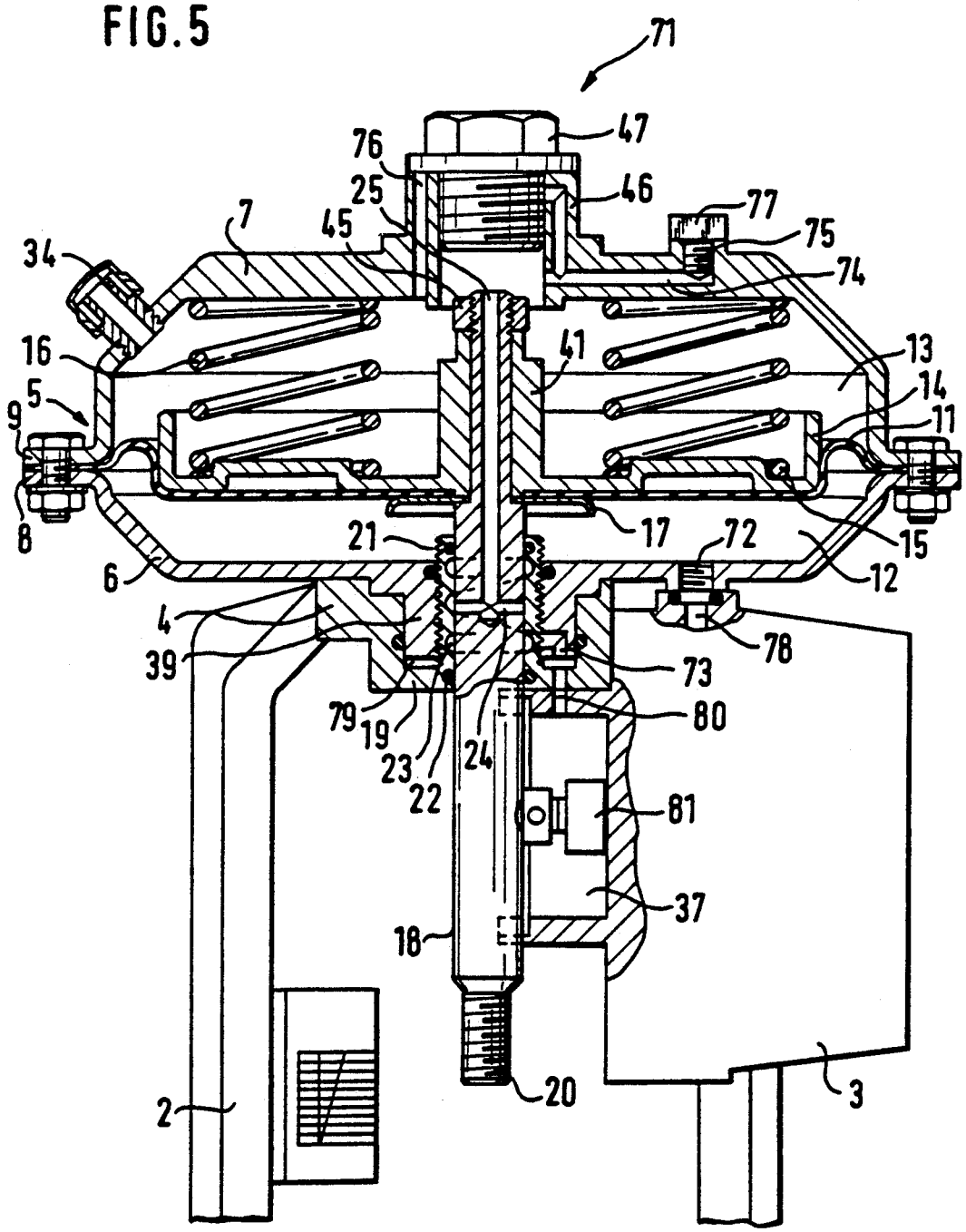
Figure 6:
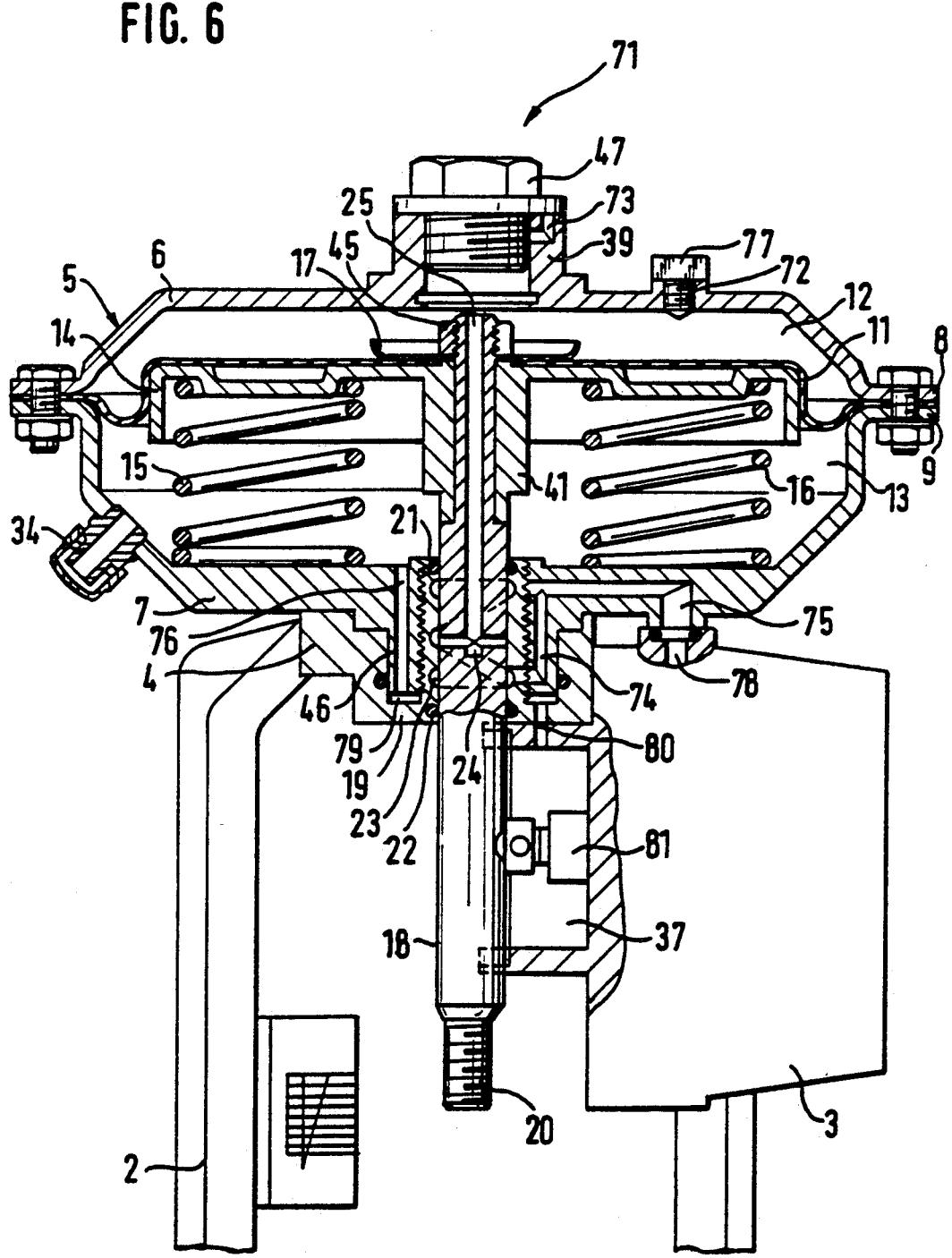

FIG. 1 is a vertical axial section of a membrane control drive of the invention in the first assembly mode, FIG. 2 is the same section of the membrane control drive of FIG. 1 for the second assembly mode, FIG. 3 is a vertical axial section of a further membrane control drive of the invention for the first assembly mode, FIG. 4 is the same section of the membrane control drive of FIG. 3 for the second assembly mode, FIG. 5 is a vertical axial section of a third membrane control drive of the invention in the first assembly mode, and FIG. 6 is the same section of the membrane control drive of FIG. 5 for the second assembly mode.

The membrane control drive shown in FIGS. 1, 2 comprises a yoke-shaped cage 2 allowing by its omitted underside to mount the membrane control drive 1 to a control device, for instance a control valve. A conventional position controller 3 not shown in further detail herein is affixed to the cage 2. Examples of position controllers are described in U.S. Pat. Nos. 4,509,403 and 4,343,224, also in the German patent 36 37 068, to which reference is made herewith.

A membrane housing 5 rests on an upper support 4 of the cage 2 and consists of two circular, superposed housing shells 6, 7 with outwardly projecting flanges 8, 9 at the mutually facing edges and clamped together at said flanges by peripherally distributed screws illustratively denoted by 10. A membrane 11 made of a flexible material, such as rubber, is clamped between the flanges 8, 9. The membrane 11 divides the inside space of the membrane housing 5 into a pressure chamber 12 and a reset chamber 13.

A membrane disk 14 is mounted in the reset chamber 13 and rests by one side on the membrane 11 and is held in place on the other side by peripherally distributed helical springs 15, 16 acting as compression springs. The helical springs 15, 16 rest against the inside of the housing shell 7. A stop disk 17 with a substantially smaller diameter rests against the membrane 11 at the side away from the membrane disk 14 and defines the lower and upper excursion of the membrane 11 by coming to a stop against the housing shell 6.

A drive rod 18 passes through the stop disk 17, the support disk 14 and the membrane 11. Said rod 18 is extended downward and passes through a hookup muff 19 and terminates in a downward protruding connection pin 20. The drive rod 18 is linked in such a way to the membrane 11 that it participates in the motion of this membrane 11. This motion is transmitted by the connection pin 20 to the spindle of a control valve.

The hookup muff 19 is inserted in relatively stationary manner into the base 4 of the cage 2. An annular transfer space 23 is formed between two sealing rings 21, 22 mounted vertically apart because of the distance from the drive rod 18 and serves as a hookup. A cross-borehole 24 issues into this annular transfer space 23 and passes centrally through the drive rod 18 and communicates with the lower end of a longitudinal borehole 25 extending upwardly and axially centrally through the drive rod 18 where it issues at said bar's free upper end.

The cross-borehole 24 and the longitudinal borehole 25 form an air-supply duct.

The hookup muff 19 comprises mutually opposite cross ducts 26, 27 issuing from the transfer annular space 23. The cross duct 27 which is on the right in this Figure continues in the base 4 into a tap 28 from an air-supply duct 30 extending upward through the cage 2 from the position controller 3 through a transfer borehole 29. Another tap 31 extends from the air-supply duct 30 to continue the first tap 28 to the outside, being sealed by a screw-in stopper 32. After the screw-in stopper 32 has been removed, the tap 31 permits shunting the position controller 3 and supplying external compressed air.

The cross duct 26 shown on the left in these views continues by a vent duct 33 going into a vent stopper 34. The vent duct 33 is crossed by a perpendicular vent-duct segment 35 issuing downward into a ventilation chamber 37 of the cage 2, or it may also be crossed by the drive rod 18. The exhaust air from the position controller 3 is fed to this ventilation chamber 37.

An annular duct 38 passes between the outer ends of the cross-ducts 26, 27 and the tap 28 and the vent duct 33 to ensure communication between the individual ducts regardless of the position of the hookup muff 19.

The membrane control drive 1 is shown in different ways in the two Figures on account of different assemblies of the components, namely as follows:

In the first assembly mode shown in FIG. 1, the housing shell 6 rests on the upper side of the base 4. At its center the housing shell 6 comprises an aperture limited by a collar 39 with an inside thread receiving the threaded hookup muff 19. The housing shell 6 and the membrane 11 enclose the pressure chamber 12 communicating through an aperture 40 with the air-supply duct 30 and hence with the position controller 3. The reset chamber 13 is located above the pressure chamber 12 and accordingly the membrane disk 14 rests from above on the membrane 11. The housing shell 7 seals the reset chamber 13 in the upward direction. The stop disk 17 is clamped between an offset of the drive rod 18 and a clamping collar 41 of the membrane disk 14 by a clamping nut 45, the membrane 11 and the membrane disk 14 being clamped between the stop disk 17 and an offset of the clamping collar 41. The connection to the drive rod 18 is secured by means of these components.

In order that the air supply be only to the pressure chamber 12, a sealing screw-in stopper 42 is inserted into the tap 28. Therefore there is no communication with the hookup muff 19. On the other hand the vent duct 33 communicates through the annular duct 38, the left cross duct 26, the annular transfer space 23, the cross-borehole 24 and the longitudinal borehole 25 with the reset chamber 13. If the membrane 11 is lifted by a corresponding air supply through the air-supply duct 30 which is controlled by the position controller 3 against the force of the helical springs 15, 16, then the air displaced thereby into the reset chamber 13 will be fed through the longitudinal borehole 25, the cross borehole 24, the annular transfer space 23, the cross duct 26 and the annular duct 38 into the vent duct 33. The vent stopper 34 then implements defined venting to the outside.

There remains communication through the vent-duct segment 35 between the reset chamber 13 and the ventilation chamber 37, as a result of which air can be exchanged between the two chambers while excluding outside air. In this manner the reset chamber 13 is protected against any corrosive atmosphere. Furthermore, the vent-duct segment 35 is sealed upward relative to the atmosphere by another screw-in stopper 44.

In the second assembly mode of FIG. 2, the membrane housing 5 was turned upside down. To carry out this procedure, the membrane housing 5 was removed from the base 4 and lifted. After removing a locking screw 47 from the collar 46 of the housing shell 7 and the clamping nut 45 from the drive rod 18, the membrane housing 5 was lifted off the drive rod 18 and rotated by 180°, as a result of which the housing shell 6 is at the top and the housing shell 7 is at the bottom. It was then set back on the drive rod 18 which now passes through the reset chamber 13 at the bottom. In this mode the stop disk 17 is clamped between the also inverted clamping collar 41 and clamping nut 45, whereas the membrane 11 and the membrane disk 14 are clamped between the stop disk 17 and the already mentioned offset of the clamping collar 41.

After the sealing screw 47 has been inserted into the collar 39, the membrane housing 5 is set on the base 4 in such manner that the collar 46 enters the aperture in the base 4. The hookup muff 19 is screwed into the inside thread of the base 4 in such a way that the membrane housing 5 is clamped to the base 4. Upon removal of the screw-in stopper 44, the reset chamber 13 communicates through an aperture 48 with the vent-duct segment 35. During the excursions of the membrane 11, the said reset chamber 13 through the vent-duct segment 35 vents the ventilation chamber 37 defined by the left side of the vent duct 33 and the vent stopper 34. The right side of the vent duct 33 was sealed relative to the hookup muff 19 by the screw-in stopper 44 previously inserted into the vent-duct segment 35.

The screw-in stopper 42 sealing the tap 28 in the assembly mode of FIG. 1 also was inverted, namely it is now screwed into the upper continuation of the air-supply duct 30. In this manner the air-supply duct 30 communicates through the tap 31, the annular duct 38, the right cross duct 27, the annular transfer space 23, the cross-borehole 24 and the longitudinal borehole 25 with the pressure chamber 12 now at the top. The position controller 3 therefore can control by means of suitable air supply and exhaust the excursion of the membrane 11 and hence of the drive rod 18 by means of the pressure chamber.

As elucidated above, the drive system for the drive rod 18 can be inverted in merely a few, simple assembly steps. In both cases the air supply to the pressure chamber 12 and the venting of the reset chamber 13 takes place through inner ducts and therefore an external and hence susceptible and complex system of pipes can be eliminated.

The membrane control drive 51 shown in FIGS. 3, 4 basically is the same as the membrane control drive 1 of FIGS. 1, 2. Accordingly the same reference numerals are used in FIGS. 3, 4 for the same or operationally same components. To avoid repetition, reference is made to the description of the membrane control drive 1 of FIGS. 1, 2 for those reference numerals. Hereafter only the differences relative to the membrane control drive 1 are being discussed.

Contrary to the case for FIGS. 1, 2, the membrane housing 5 now is closed, that is, it lacks the apertures 40 and 48 for the supply of compressed air to the pressure chamber 12 and for venting the reset chamber 13. Therefore no ducts are bored through the base 4. Air-supply or venting now takes place through a hookup muff 52 of a wholly different design.

This hookup muff 52 is inserted in locally stationary manner in the base 4 of the cage 2, just as was the hookup muff 19, and is screwed either into the collar 39 (FIG. 3) or into the collar 46 (FIG. 4). This hookup muff 52 comprises an annular transfer space 23 between two mutually vertically spaced sealing rings 21, 22 and to this extent it remains unmodified relative to the design of FIGS. 1, 2. A vent-duct segment 54 issues from the annular transfer space 23 to the left and horizontally and enters the ventilation chamber 37. The vent stopper 34 screwed into the base 4 starts in this ventilation chamber 37.

An air-supply duct denoted as a whole by 55 is bored into the hookup muff 52 on the opposite side and consists of a horizontal supply-duct segment 56 and of a continuous supply-duct segment 58 issuing from the segment 56 at a tap 57 and extending upward and vertically. The horizontal supply-duct segment 56 issues on one side into the annular transfer space 23 and on the other side into an external annular collecting space 59 shaped into the hookup muff 52 and externally enclosed by a cover ring 60. The annular collecting space 59 communicates in a manner not shown herein in further detail with the position controller 3 and can be loaded by this regulator with compressed air.

The vertical supply-duct segment 58 reaches as far upward as the top end face of the hookup muff 52 where it is open. A second vent-duct segment 61 starts about centrally from said segment 58. The segment 61 issues, like the first vent-duct segment 54, into the ventilation chamber 37.

The assembly mode of FIG. 3 corresponds to that of FIG. 1, that is, the pressure chamber of this mode is below the membrane 11 and the reset chamber 13 is above the membrane 11 and the pressure chamber 12. A sealing screw-in stopper 62 is inserted into the horizontal supply-duct segment 56 between the annular transfer space 23 and the tap 57, whereas the vertical supply-duct segment 58 is open. The vent-duct segment 61 branched off the said segment 58 also is sealed by a sealing screw-in stopper 63.

When compressed air is fed from the position controller 3 to the annular collection space 59, this air passes through the horizontal and the vertical supply-duct segments 56, 58 into the pressure chamber 12, as a result of which the membrane 11 is lifted against the opposition of the helical screws 15, 16. In the process, the air displaced from the reset chamber 13 is moved through the longitudinal borehole 25, the cross bore 24, the annular transfer space 23 and the first, open vent-duct segment 54 into the ventilation chamber 37. The vent stopper 34 therefore causes specific venting to the outside.

The assembly mode of FIG. 4 corresponds to that of FIG. 2, ie, the reset chamber 13 is below the membrane 11 and the pressure chamber 12 is above it. A sealing screw-in stopper 64 is inserted into the first vent-duct segment 54. The screw-in stopper 62 inserted in the mode of FIG. 3 in the horizontal supply-duct segment 56 and the screw-in stopper 63 seated in the second vent-duct segment 61 were removed. On the other hand a sealing screw-in stopper 65 is inserted between the tap 57 and the tap of the second vent-duct segment 54.

When there is pressure applied from the position controller 3, the compressed air passes through the horizontal supply-duct segment 56, the annular transfer space 23, the cross-borehole 24 and the longitudinal borehole 25 into the pressure chamber 12 at the top, as a result of which the membrane 11 is forced down. The air displaced in this process from the reset chamber 13 passes through the upper part of the vertical supply-duct segment 58 and the vent-duct segment 61 tapping into it into the ventilation chamber 37 and from there through the vent stopper 34 to the outside air.

The membrane control drive 71 shown in FIGS. 5 and 6 is the same in its essential design as the membrane control drive 1 of FIGS. 1 and 2 and as 51 of FIGS. 3 and 4. Therefore the same reference numerals are used for the same or operationally the same parts without significant changes in FIGS. 5 and 6. To avoid repetition, the description of the membrane control drive 1 of FIGS. 1 and 2 is referred to for those reference numerals. Only the differences with respect to the membrane control drive 1 are discussed below.

Contrary to the representation of FIGS. 1 and 2, the position controller 3 and the membrane housing 5 are shown here shifted by 90° for the sake of clarity. In fact however the position controller 3 is mounted the same way as in the membrane control drive 1.

In the present embodiment mode, a number of ducts are formed into the housing shells 6, 7. Illustratively a short, vertical first air-supply duct 72 is present in the housing shell 6 on the side of the pressure chamber. Also, a short, bent-around first vent-duct segment 73 is present in the collar 39 of this housing shell 6. A second air-supply duct 74 is present in the bottom of the housing shell 7 on the side of the reset chamber and comprises a mouth segment 75 pointing outward and mounted precisely above the first air-supply duct 72. A horizontal segment of the second air-supply duct 74 extends from this mouth segment 75 to the collar 46. Also, a vertical second vent-duct segment 76 is present in the collar 46 and opposite the second supply duct 74 and is open toward the reset chamber 13.

The hookup muff 19 comprises a transfer space 23 formed by a helical groove in the inside of the hookup muff 19 At the lower side the hookup muff 19 is in the form of a pot enclosing the lower end of the particular collar 39 or 46. Said muff is screwed on the outside of said collar and clamped to the lower side of the base 4. The membrane housing 5 is affixed thereby to the base 4.

Moreover, the vent stopper 34 is directly mounted in the housing shell 7 on the side of the reset chamber. Together with the clamping collar 41, the membrane disk 14 forms an integral unit.

The assembly mode of FIG. 5 corresponds to that of FIG. 1, ie, the pressure chamber 12 is underneath the membrane 11 and the reset chamber 13 is above the membrane 11 and the pressure chamber 12. The second air-supply duct 74 is blocked in the region of its mouth segment 75 by a sealing screw 77 and the second vent-duct segment 76 is blocked by the edge of the sealing screw 47. The reset chamber 13 is sealed thereby in the upward direction.

The membrane housing 5 is inserted in such a way into the base 4 that the first vent-duct segment rests on a mouth segment 78 of the position controller 3. The compressed-air supply passes through this mouth segment 78 directly from the position controller 3 into the pressure chamber 12 above. In this manner the membrane 11 can be displaced against the opposition of the helical springs 15, 16.

The venting of the reset chamber 13 is implemented through the longitudinal borehole 25 and the cross-borehole 24 in the drive rod 18, furthermore through the helical transfer space 23 and a short cross-borehole in the hookup muff 23, starting at said space and extending to the first vent-duct segment 73. This vent-duct segment 73 issues downward into an annular vent space 79 left clear by the pot-segment of the hookup muff 23 and the lower end face of the collar 39. A vertical borehole 80 extends from this vent space 79 through the sealing collar 23 and a holder arm of the position controller 3 to issue into the ventilation chamber 37. Inside this ventilation chamber 37, the position controller 3 is linked by coupling member 81 to the drive rod 18.

The assembly mode of FIG. 6 corresponds to that of FIG. 2, ie, the reset chamber 13 now is below the membrane 11 and the pressure chamber 12 is above. The reverse assembly takes place in the same manner as described for the embodiment of FIGS. 1 and 2. In this case the membrane housing 5 is so seated on the base 4 that the collar 46 of the housing shell 7 enters the base 4. Assembly is such that the second air-supply duct 74 comes to rest by its mouth segment 75 against the mouth 78 of the position controller 3. The second air-supply duct is so placed inside the collar 46 that it issues into the cross borehole already mentioned above in the hookup muff 19, said cross-borehole being the communication between the second air-supply duct 74 and the transfer chamber 23. The compressed air issuing from the position controller 3 therefore passes through the second air-supply duct 74 into the transfer chamber 23 and from there through the cross-borehole 24 and the longitudinal borehole 25 into the pressure chamber 12.

The venting of the reset chamber 13 now takes place through the second vent-duct segment 76 which for the shown position of the membrane housing 5 issues into the annular vent space 79. This annular vent space 79 in turn communicates through the vertical borehole 80 with the ventilation chamber 37.

The first air-supply duct 72 is sealed on the side of the pressure chamber by the sealing screw 77 previously removed from the second air-supply duct 74. The first vent-duct segment 73 is sealed by the sealing screw 47. In this manner the pressure chamber 12 is fully sealed in the upward direction.

It is obvious at once that this particular design of the membrane control drive 71 is characterized by the individual duct connections being suitably and automatically achieved by merely reversing the assembly of the membrane housing 5, that is, the sealing stoppers or the like need not being removed or inserted.

I claim:

1. Pneumatic control drive (1, 51, 71) for control valves, comprising a drive housing (5) and a drive member (11) displaceable therein to which is affixed a drive element (18) movable together with it and serving to actuate the control valve, said drive member (11) dividing the drive housing (5) into a pressure chamber (12) and into a reset chamber (13) with a reset member (15, 16) loading the drive member, a position controller (3) being mounted near one of the chambers (12 or 13) and communicating through an inner air-supply duct (30, 28, 55, 58, 72, 74) with the pressure chamber (12) and moreover a vent duct (33, 35, 54, 58, 73, 76) issuing from the reset chamber (13) toward a vent aperture, characterized in that at least the drive member (11) and the reset member (15, 16) are assembliable in reversible manner so that in a first assembly mode, the pressure chamber (12) shall be near the position controller (3) and in a second assembly mode the reset chamber (13) shall be near the position controller (3), in that the drive element (18) comprises an air-supply duct (24, 25) issuing at the side of the drive member (11) away from the position controller (3) into the chamber (12 or 13) there, and in that the air-supply duct (24, 25) extends to a hookup (23) adjacent to the position controller (3), the hookup (23) in the second assembly mode being connectable to the position controller (3), the communication between the position controller (3) and the chamber (13) near the position controller (3) being blockable and this chamber (13) being openable toward a further vent duct, the hookup in the first assembly mode being connectable to the vent duct while blocking the communication with the chamber near the position controller (3), and the air-supply duct (30, 58, 72) being openable toward the chamber (12) near the position controller (3).

2. Control drive defined in claim 1, characterized in that the hookup is in the form of a transfer space (23) into which issues the air-supply duct (24, 25) and which is enclosed by a stationary hookup muff (19, 52) inside which the drive element (18) is guided in sliding manner while being sealed with respect to two sides.

3. Control drive defined in claim 2, characterized in that the transfer space (23) is in the form of an annular space.

4. Control drive defined in claim 2, characterized in that the transfer space (23) is a helical transfer groove of which the shoulder rests in guiding manner against the drive element (18).

5. Control drive defined in claim 2 characterized in that the connector muff (52) enters the membrane housing (5) and in that one of the air-supply duct (58) and the vent duct (61) passes through the hookup muff (52) and from there issues into chamber (12, 13) adjacent to said muff.

6. Control drive defined in claim 5, characterized in that the air-supply duct (55) comprises a tap (57) with a supply-duct segment (56) leading to the transfer space (23) and moreover comprises a supply-duct segment (58) issuing into the adjacent chamber (12, 13), the supply-duct segments (56, 58) being alternatingly sealable.

7. Control drive defined in claim 6, characterized in that the supply-duct segment (56) passing into the adjacent chamber (12, 13) communicates with a vent-duct segment (61) which in alternation with the supply-duct segment (58) can be closed in such a way that the adjacent chamber (12, 13) communicates in one case with the vent-duct segment (61) and in the other with the position controller (3).

8. Control drive defined in claim 7, characterized in that a further vent-duct segment (54) is provided which communicates with the transfer space (23) and which can be closed and opened alternatingly when the vent-duct segment (61) communicating with the supply-duct segment (58) is open or closed resp.

9. Control drive defined in claim 1 characterized in that screw-in stoppers (32, 42, 44, 62, 63, 64, 65) are provided to block the air-supply duct (30, 31, 55, 56, 58) and the vent-duct (33, 35, 54, 61) and their duct segments (31, 56, 58, 54, 61).

10. Control drive defined in claim 1 characterized in that the drive member (11) and the reset member (15, 16) together with the drive housing (5) can be reversed from the first into the second assembly mode and vice versa after the drive member (11) has been detached from the drive element (18).

11. Control drive defined in claim 10, characterized in that the drive housing (5) comprises a first air-supply duct (72) on the side of the pressure chamber and extending in such a way that it is connected to the position controller (3) in the first assembly mode of the drive housing (5) and that it can be blocked in the second assembly mode, and in that the drive housing (5) comprises a second air-supply duct (74) at the side of the reset chamber which extends in such a way that for the second assembly mode of the drive housing (5) it is connected to the position controller (3), the second supply duct (74) being amenable to being blocked in the first assembly mode.

12. Control drive defined in claim 11, characterized in that the drive housing (5) comprises a vent-duct segment (73) at the side of the pressure chamber and which in the second assembly mode can be blocked and extends in such a way that for the first assembly mode it communicates on one hand with the vent aperture (80) and on the other hand with the hookup (23).

13. Control drive defined in claim 11 characterized in that the drive housing (5) comprises a second vent-duct segment (76) at the side of the reset chamber which for the first assembly mode can be blocked and extends in such a way that for the second assembly mode it communicates with the vent aperture (80).

14. Control drive defined in claim 1 characterized in that the drive member (11) can be affixed at various heights to the drive element (18).

15. Control drive defined in claim 1 characterized in that the drive housing (5) is mounted on a base (4) inside which extend the air-supply duct (30, 31) and the vent duct (33, 35).

16. Control drive defined in claim 15, characterized in that the hookup (23) is present in an aperture of the base (4).

17. Control drive defined in claim 1 characterized in that the position controller (3) is mounted on an exit side of the drive element (18).

18. Control drive defined in claim 1 characterized in that the air-supply duct (30) comprises a sealable connection (31, 32) to the outside.

19. Control drive defined in claim 1, characterized in that at least one vent duct issues into a ventilation chamber (37) of the position controller (3).

20. A pneumatic control device for a control valve, comprising:
 a) a drive housing;
 b) a displaceable member disposed within said housing and dividing said housing into a pressure chamber and a reset chamber;
 c) a control element operably connected to said displaceable member and extending therefrom, said control element displaceable with said displaceable member;
 d) a reset member operably associated with and loading said displaceable member;
 e) a position controller proximate said housing;
 f) a first air-supply duct operably associated with said controller for supplying air thereto;
 g) a vent duct communicating with said reset chamber for causing venting thereof;
 h) a second air-supply duct within said control element, and having a first axially extending portion communicating with said pressure chamber and a second radially extending portion proximate said controller; and i) a third air-supply duct interposed between said first and second air-supply ducts for communicating air therebetween in response to operation of said controller and for thereby causing displacement of said displaceable member.

21. The control device of claim 20, further comprising:

a) a hook muff disposed about and slidably receiving said control element; and b) said third air-supply duct includes a transfer space disposed about said muff and extending along said element, said space communicating with said radially extending portion of said second air-supply duct.

22. The control device of claim 21, wherein:

a) said space is one of an annulus and a helical groove.

23. The control device of claim 20, wherein:

a) said radially extending portion is disposed exteriorly of said housing.

24. The control device of claim 23, wherein:

a) said radially extending portion extends through opposite sides of said element; and b) said axially extending portion is centrally disposed relative to said radially extending portion.

25. The control device of claim 20, wherein:

a) said reset member includes at least two springs peripherally disposed about said displaceable member.

26. The control device of claim 25, wherein:

a) a membrane disk rests upon said displaceable member; and b) each of said springs has a first portion engaged with said disk and a second portion engaged with said housing.

27. The control device of claim 20, wherein:

a) said displaceable member is secured to said control element intermediate opposite first and second ends thereof.

28. The control device of claim 20, wherein:

a) a stop disk is secured to said control element and is engageable with said housing for limiting displacement of said element and thereby of said displaceable member.

29. A pneumatic control device for a control valve, comprising:

a) a drive housing;

b) a displaceable member disposed within said housing and dividing said housing into a pressure chamber and a reset chamber;

c) a control element having a first end operably connected to and displaceable with said displaceable member and a second remote end for connection with a control valve;

d) a reset member operably associated with and loading said displaceable member;

e) a position controller proximate said housing;

f) a first air-supply duct operably associated with said controller for supplying air to said pressure chamber in response to operation of said controller;

g) a second air-supply duct within said element, and having a first axially extending portion communicating with said reset chamber and a second radially extending portion; and h) a third air-supply duct interposed between said controller and said radially extending portion for causing said reset chamber to be vented to said controller.

30. The control device of claim 29, further comprising:

a) a hookup muff disposed about and slidably receiving said control element; and b) said third air-supply duct includes a transfer space extending about said muff and along said control element.

31. The control device of claim 30, wherein:

a) said transfer space is one of an annulus and a helical groove.

32. The control device of claim 29, wherein:

a) said radially extending portion extends through opposite sides of said control element; and b) said axially extending portion is centrally positioned relative to said radially extending portion.

33. The control device of claim 32, wherein:

a) said radially extending portion is disposed exteriorly of said housing.

34. The control device of claim 29, wherein:

a) said displaceable member is a membrane;

b) a membrane disk rests upon said membrane; and c) said reset member has a first portion engaged with said disk and a second portion engaged with said housing.

35. The control device of claim 34, wherein:

a) said reset member includes at least first and second springs disposed peripherally about said disk.

36. The control device of claim 34, wherein:

a) a stop member is engaged with said membrane along a side thereof opposite to the side upon which said disk rests, and said stop member is engageable with said housing for limiting displacement of said control element and thereby of said membrane.

* * * * *